United States Patent [19]
Gargini

[11] 4,302,771
[45] Nov. 24, 1981

[54] WIRE BROADCASTING SYSTEM WITH SUBSCRIBER CONTROLLED SWITCHED PROGRAM SELECTION

[75] Inventor: Eric J. Gargini, West Drayton, England

[73] Assignee: Communications Patents Limited, London, England

[21] Appl. No.: 171,315

[22] Filed: Jul. 23, 1980

[30] Foreign Application Priority Data

Aug. 22, 1979 [GB] United Kingdom ............... 29283/79

[51] Int. Cl.³ ............................................. H04N 7/10
[52] U.S. Cl. ........................................ 358/86; 455/6
[58] Field of Search ........................ 358/86; 455/3,4,6

[56] References Cited

U.S. PATENT DOCUMENTS

4,035,838  7/1977  Bassani .................................. 358/86
4,064,460  12/1977  Gargini .................................. 358/86

Primary Examiner—Howard Britton
Attorney, Agent, or Firm—Laurence R. Brown

[57] ABSTRACT

A wired broadcasting system comprising a central station at which a plurality of television signals are made available, a plurality of exchanges connected to the central station by a plurality of trunk cables on which the television signals are broadcast, and a plurality of subscriber units each connected to an exchange. Each subscriber unit is provided with means for controlling a respective selector at the exchange to select a desired one of the program signals for transmission to that subscriber. Each trunk cable carries a plurality of frequency division multiplexed signals and each selector comprises a first selecting means for selecting the signals on one said trunk cable and a second selecting means for selecting one of the signals on said one trunk cable for transmission to the respective subscriber unit.

8 Claims, 6 Drawing Figures

WIRE BROADCASTING SYSTEM WITH SUBSCRIBER CONTROLLED SWITCHED PROGRAM SELECTION

The present invention relates to a wired broadcasting system in which programme selection is effected by subscriber controlled switches.

British Patent No. 1,272,594 describes a switched wired broadcasting system in which signals made available at an exchange are distributed to subscribers at high frequency (i.e. 7.9 MHz) on twisted-pair conductors. Each subscriber unit is provided with pulse generating equipment to enable subscribers to remotely control electro-mechanical switches located at the exchange. The switches are controllable to connect respective subscribers conductors to bus-bars at the exchange to which the HF signals are applied. Such a system makes it possible to provided a large number of very high quality programmes but it is necessary to link each subscriber unit to the exchange by a respective cable. In small, high density applications only one exchange is required, but in large or low density applications it is necessary to provide a series of exchanges each serving a local area to avoid excessive subscriber-exchange cable costs. Signal distribution from a central station or head-end to each exchange is effected over trunk cables. As all the signals are at HF, each must be provided with its own trunk cable, and this means that for example in a thirty channel system thirty trunk cables are required. Particularly in extensive systems the cost of the trunk cables and their installation becomes excessive.

The high trunk cable costs associated with large scale systems of the type described in British Patent No. 1,272,594 can be overcome as described in U.S. Pat. No. 4,064,460 by providing a single coaxial trunk cable on which individual programme signals are frequency division multiplexed (FDM). Programme selection can then be effected by frequency-converting desired programme signals down to a frequency to which the subscribers equipment has been permanently tuned, the frequency conversion being carried out by equipment located at an exchange and controllable by individual subscribers connected to that exchange. In practice however it is difficult to achieve high quality reception except when only a few programme channels are available due to interference effects.

In both the above described systems each subscriber must be able to control a respective array of switches the number of which is equal to the number of channels made available on the system. In a high channel capacity system, the cost of supplying and installing high numbers of switches can become prohibitive.

It is an object of the present invention to provide a broadcasting system in which programme selection is effected by subscriber-controlled switching and which provides a high channel capacity and high quality without excessive cost.

According to the present invention, there is provided a wired broadcasting system comprising a central station at which a plurality of television signals are made available, a plurality of exchanges connected to the central station by a plurality of trunk cables on which the television signals are broadcast, and a plurality of subscriber units each connected to an exchange, each subscriber unit being provided with means for controlling a respective selector at the exchange to select a desired one of the programme signals for transmission to that subscriber, characterised in that each trunk cable carries a plurality of frequency division multiplexed signals and each selector comprises a first selecting means for selecting the signals on one said trunk cable and a second selecting means for selecting one of the signals on said one trunk cable for transmission to the respective subscriber unit.

The first selecting means is preferably in the form of a first array of solid state switches arranged between each trunk cable and a common output connected to the second selecting means. The second selecting means preferably comprises a mixer receiving the output of the first selecting means and the common output of a second array of solid state switches respective ones of which are connected to the outputs of local oscillators. The frequencies provided by the local oscillators are such that each of them when mixed with a respective signal on the trunk cable produces an output signal at a frequency to which the subscriber unit is permanently tuned. Thus the first selection means selects a group of signals allocated to a particular trunk cable, and the second selecting means frequency-converts one of the selected group to the frequency to which the subscriber unit is responsive.

To enable all the signals on said one trunk cable to be applied simultaneously to the mixer, the frequencies of the signals on each trunk cable are preferably interrelated to avoid the production of spurious second or third order signals.

The mixer may be in the form of a field effect transistor.

The subscriber unit controlling means is preferably in the form of a dialling unit which when actuated transmits a train of pulses to the exchange, the number of pulses in the train corresponding to the reference number selected by the subscriber. Thus the subscriber must generate two pulse trains to select a programme, the first train controlling the group selection and the second train controlling the selection of one programme signal from that group. The pulses may be counted by first and second counters enabled and disabled by a single bistable circuit such that the first train is counted by the first counter, an interdigital pause causes the bistable to change state, and the second train is counted by the second counter. The first and second counters respectively control the first and second arrays of solid state switches.

An embodiment of the present invention will now be described, by way of example, with reference to the accompanying drawings, in which.

Figure 1:
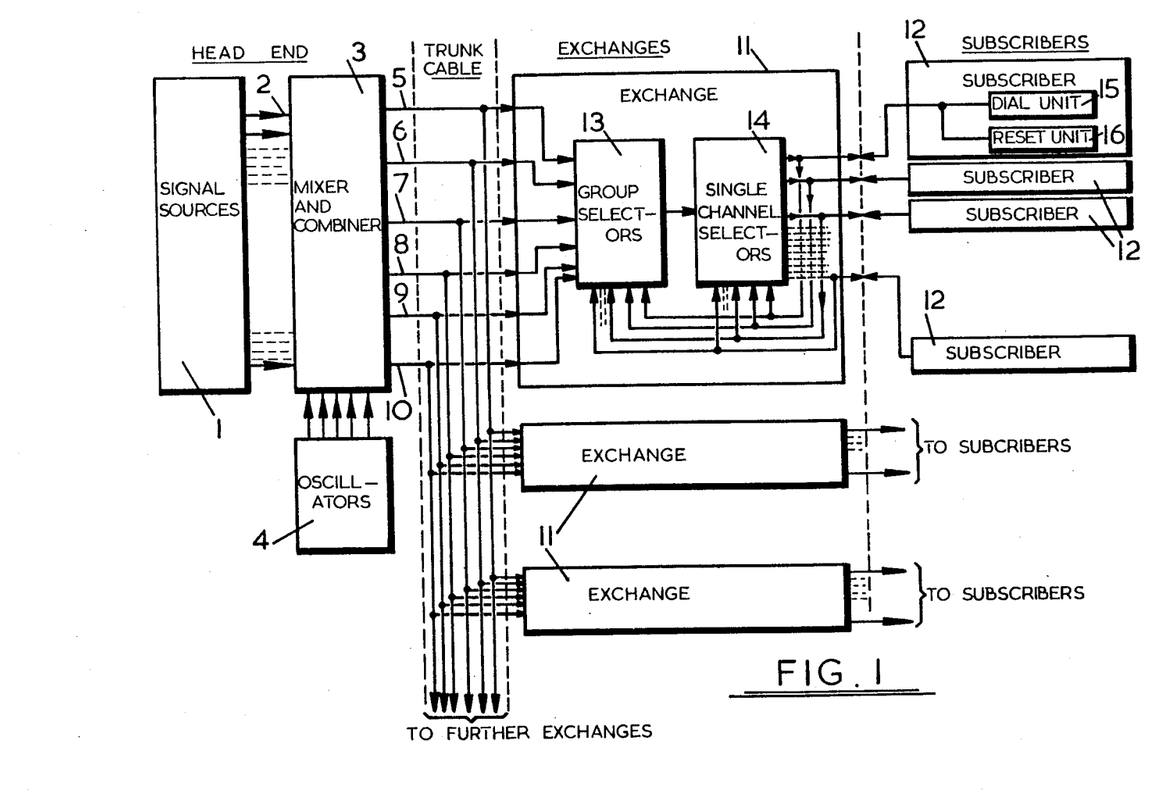
FIG. 1 is a schematic diagram of portions of a thirty channel system in accordance with the present invention.

Referring to FIG. 1, the basic lay-out of a thirty-channel system operating in accordance with 525 line NTSC standards is diagrammatically illustrated. All programme signals which are to be broadcast over the system are provided by signal sources 1 located at a central station or head-end. The programme signals may for example be locally generated, derived from recordings, or derived from radiated transmissions. Each programme signal is applied via a respective one of thirty cables 2 to a mixer and combiner 3. The signals on the first five channels are mixed with respective ones of five fixed frequency signals provided by local oscillators 4 and the five resultant signals are combined and applied to cable 5. The remaining twenty five signals are divided into five groups of five, mixed and combined and applied to cables 6 to 10 respectively in the same manner as with the first five channels. Thus channels one to five appear on cable 5, channels six to ten on cable 6, channels eleven to fifteen on cable 7, channels sixteen to twenty on cable 8, channels twenty one to twenty five on cable 9, and channels twenty six to thirty on cable 10.

The five programme signals carried by each of cables 5 to 10 have frequencies such that no second or third order spurious signals are produced, i.e. the five signals can be allotted to frequency channels having luma frequencies of 69.2, 75.2, 93.2, 123.2 and 135.2 MHz respectively.

The six cables 5 to 10 are connected to a trunk cable which links the head end and each of a series of identical exchanges 11 only one of which will be described in detail. Each exchange 11 supplies signals to a respective group of subscriber units 12. There may be for example several hundred subscriber units 12 connected to each exchange.

The exchange comprises an array of group selectors 13 controllable by respective subscribers to select the group of channels appearing on any one of cables 5 to 10, and an array of single channel selectors 14 controllable by respective subscribers to select one of the channels from the group of channels selected by the associated group selector 13. Each subscriber 12 is provided with a dial unit 15 which may be manipulated to transmit dialling pulses to the exchange to control the selectors, and a reset unit 16 which can be operated to cancel a programme selection.

The oscillators, signal mixing and combining circuits of the head-end operate in a conventional manner familiar to persons skilled in the field of wired broadcasting and it is not therefore thought necessary to describe them further.

Figure 2:
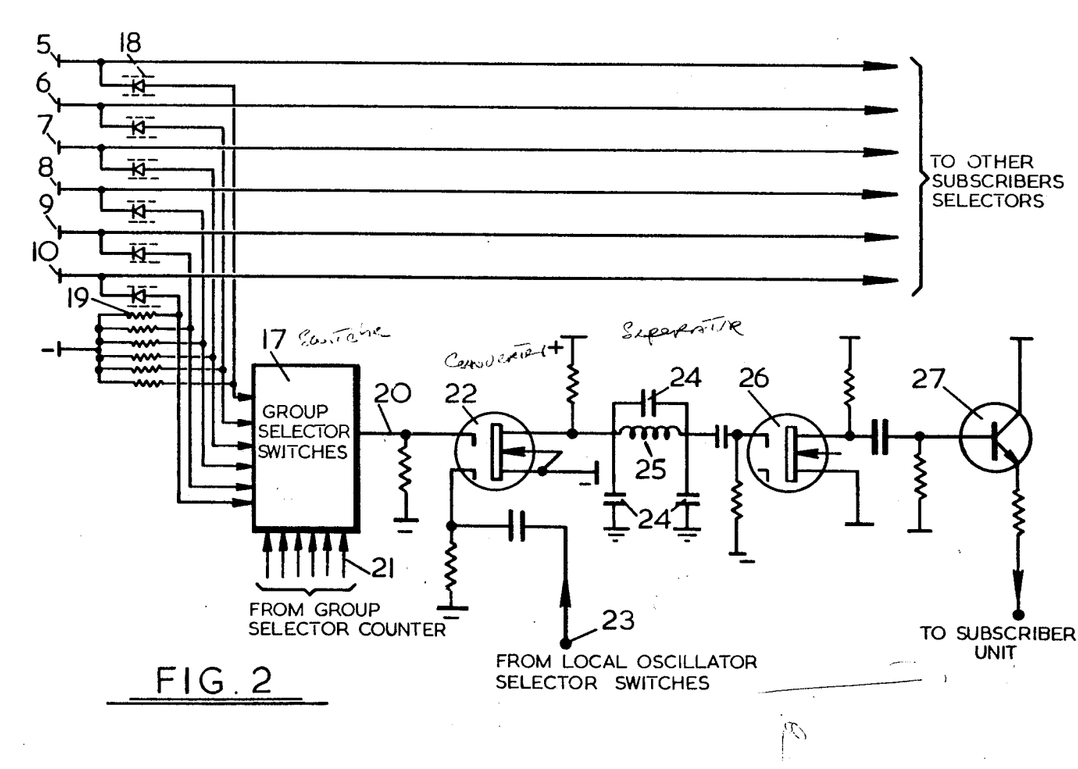
FIG. 2 is a diagram of selection circuitry located in one of the exchanges of FIG. 1.

Referring now to FIG. 2, details of one subscribers programme selection circuitry will be described. The six groups of programme signals on cables 5 to 10 are applied to respective inputs to a six way switch 17 via screened diodes 18. The diodes 18 and resistors 19 improve the isolation of switch 17 at higher frequencies. The switch 17 comprises six solid state switches which may be closed to connect any one of its six inputs to output 20. The switches may be of the type described in German Patent Application No. P 27 48 662.0 and are controlled by inputs 21 received from a group selector counter controlled by the subscriber as described below.

The group of signals selected by the switches 17 is applied to a mixer formed by a field effect transistor (FET) 22. The mixer also receives the output of a local oscillator (not shown) via terminal 23. As will be described below, the frequency of the signal applied to terminal 23 is such that one of the signals applied to the mixer 22 is frequency converted to a specific frequency, such as 7.9 MHz, to which the subscribers unit is permanently tuned. Thus by controlling the switches 17 to select a group of five channels from thirty, and then controlling the local oscillator frequency applied to the mixer 22 to select one channel from five, the subscriber can effectively select any one of the thirty channels available on the system.

The output of the mixer 22 is applied via a low pass filter and rejector formed by capacitors 24 and resistor 25 to an HF amplifier formed by FET 26. The filter has a cut-off frequency of 9 MHz and rejects signals at 13.9 MHz (i.e. signals on the nearest frequency adjacent channel). The output of the FET 26 is applied to an output stage formed by transistor 27, the signal at the emitter of transistor 27 being applied to a cable connecting the exchange to the respective subscriber.

Figure 3:
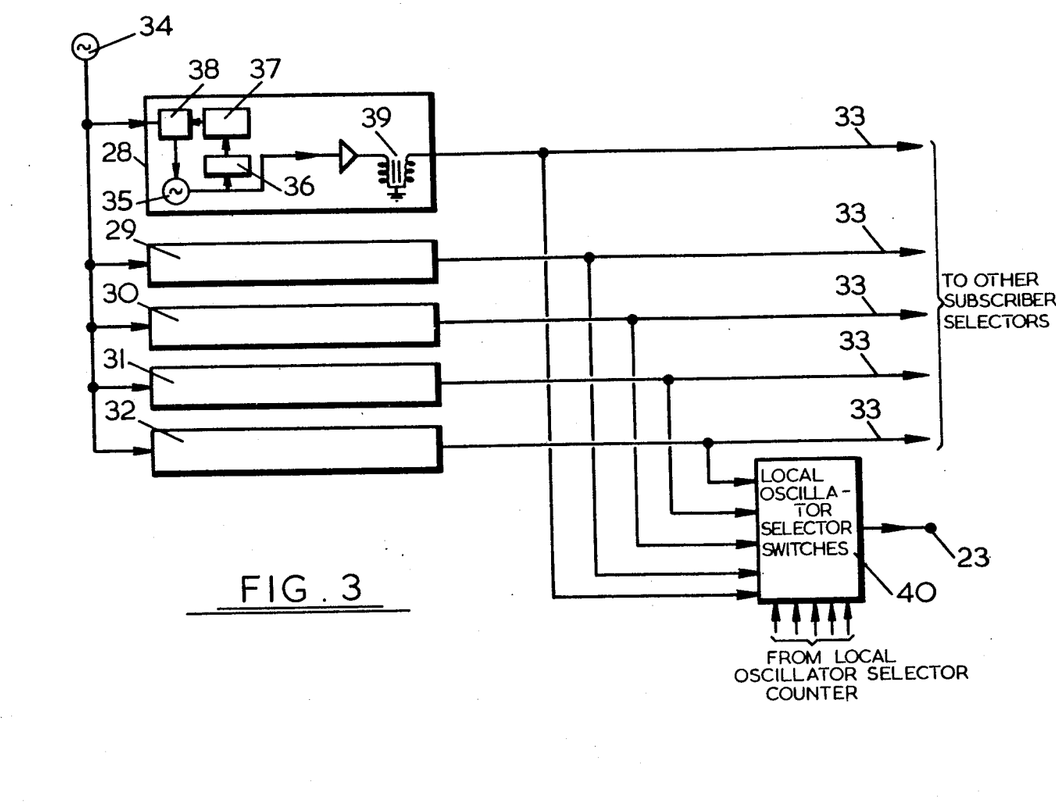
FIG. 3 illustrates the arrangement of local oscillators in the exchange of FIG. 1.

Referring now to FIG. 3, the exchange comprises five local oscillator circuits 28 to 32 providing fixed frequency signals on outputs 33. The outputs of the circuits 28 to 32 are locked to 144, 132, 102, 84 and 78 MHz respectively. Except for their basic operating frequency, each of the circuits 28 to 32 is the same. For example, circuit 28 receives the output of a 300 KHz master oscillator 34 which may be located at the head-end and comprises this master frequency with the output of local oscillator 35 after division by twenty in divider 36 and division by twenty four in an adjustable divider 37. The comparison is effected by comparator 38 which controls the local oscillator such that its output is locked to a frequency equal to 300 KHz multiplied by four hundred and eighty, i.e. 144 MHz. The output of the oscillator 35 is amplified and passed via transformer 39 to the output 33.

The outputs 33 then carry fixed frequency signals the frequencies of which are multiples of 6 MHz, the NTSC specified bandwidth. These signals are applied to local oscillator five way selector switches 40 which are controlled by a local oscillator control counter as described below. The selected local oscillator output is applied to terminal 23 (FIG. 2).

Figure 4:
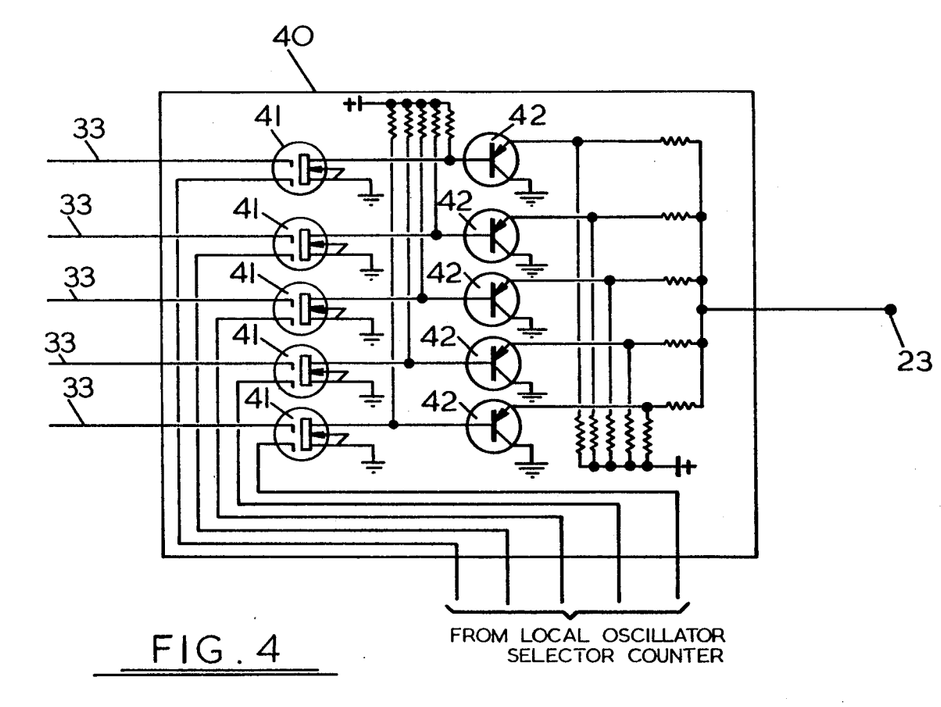
FIG. 4 is a diagram of switches controlling the outputs of the local oscillators of FIG. 3.

Referring now to FIG. 4, the switches 40 of FIG. 3 are shown in greater detail. Each of the local oscillator outputs 33 is applied to a respective FET 41 controlled by the local oscillator selector counter as described below. The signal selected by the FET's 41 is applied via an output stage formed by the respective one of transistors 42 to terminal 23 (FIGS. 2 and 3).

Each subscriber unit is provided with a conventional telephone dialling set which enables him to transmit a series of from one to ten dial pulses to the exchange. Each subscriber unit is also provided with a reset button the depression of which transmits a reset pulse to the exchange devices of this type are described in German Patent Application P 27 48 661.9 and therefore it is not necessary to describe the circuits in detail. In the present case, if a subscriber wishes to select channel eighteen (i.e. the third channel of the fourth group) he dials "4" to select the appropriate group and "3" to select the appropriate channel within that group. This results in trains of four and three pulses being transmitted sequentially to the exchange. If the subscriber wishes to cancel a selection, he merely depresses the reset button.

Figure 5:
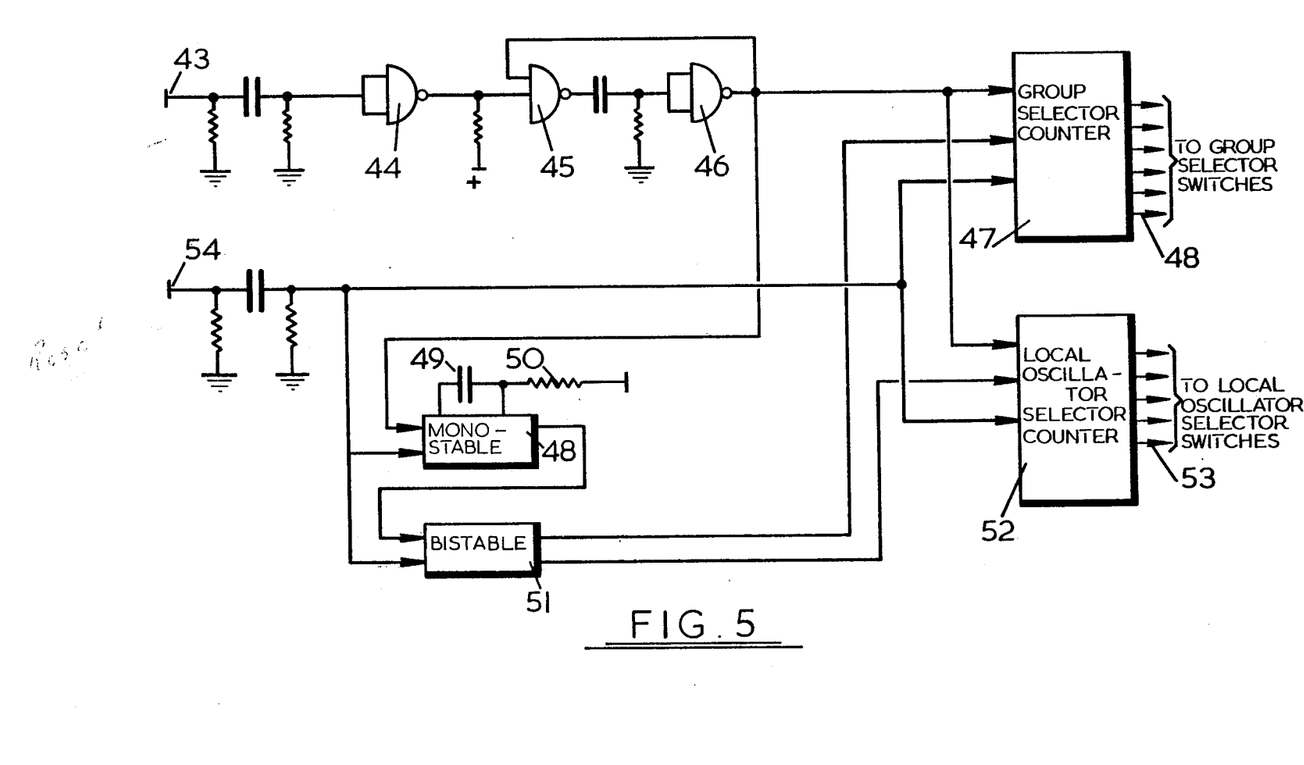
FIG. 5 illustrates exchange circuitry responsive to dial and reset pulses transmitted from a subscriber unit.

Referring now to FIG. 5, the exchange equipment which processes dial and reset pulses received from one subscriber will be described. Dial pulses transmitted to the exchange are applied to terminal 43, "cleared" by NAND gate 44, and shaped in a monostable formed by NAND gates 45 and 46. The output of the monostable is applied as a clock input to the group selector counter 47 the outputs 48 of which control switch 17 of FIG. 2.

In the case of the selection of channel eighteen, four pulses are thus clocked into counter 47, there is an interdigital pause, and then three further pulses are received. The pause is determined by conventional latching circuitry in the subscribers dial unit to be a minimum of 400 mS. A monostable 48 having a time constant of 200 mS as determined by capacitor 49 and resistor 50 responds to the interdigital pause to apply a negative trigger pulse to a bistable 51 the Q and $\bar{Q}$ outputs of which are connected to 'inhibit count' inputs of the counter 47 and the local oscillator selector counter 52. Accordingly, the counter 47 cannot respond to the second series of three dial pulses. The dial pulses are however also applied to the clock input of counter 52, which is now uninhibited. Accordingly the outputs 53 of counter 52 register the three second digit dial pulses and control the appropriate FET 41 (FIG. 4) appropriately. The subscriber thus receives the selected programme.

If the subscriber wishes to cancel a selection, he presses the reset button and a reset pulse is transmitted to the exchange and applied to terminal 54. This resets the counters 47 and 52, the monostable 48 and the bistable 51. A fresh programme selection can then be made.

Although in the described embodiment of the invention the system comprises a distribution network of conductive wires, signals may be distributed on optical fibres rather than or as well as on conductive wires.

In the thirty channel system described above, it will be noted that only six trunk cables are required between the head-end and the exchanges. In conventional switched distribution systems each programme signal requires a separate trunk cable, and thus in the case of the thirty channel system described the number of trunk lines is reduced from thirty to six.

As programme selection is multiplicative, the number of selector switches required for each subscriber is reduced from the "one per programme" of conventional systems. Thus in the case of the thirty channel system described only eleven switches are required rather than the thirty switches of conventional switched systems.

The choice of carrier frequencies used on the trunk cables such that no second or third order spurious signals result makes it feasible to apply all the signals of the five channels on any one trunk simultaneously to a single mixer.

It should be noted that the use of the output of the 300 KHz master oscillator as a reference frequency to frequency-locking the local oscillators ensures that at the H.F. outputs to the subscriber units are either synchronised together or are in a fixed offset frequency relationship. All the VHF carriers applied to the trunk cables from the head-end are of course locked to a common master frequency with a fixed relationship to the master oscillator reference frequency.

As mentioned above, the specific trunk frequencies used in the described embodiment of the invention are suited to NTSC standards. It should be noted that other sets of frequencies are also free from second and third order beat patterns and may therefore be used to equally good effect. It is however important to choose the frequency set used such that a practical mixer may be used which accepts all input carriers simultaneously without picture degradation when no input filtering of unwanted carriers is provided at the mixer input.

Figure 6:
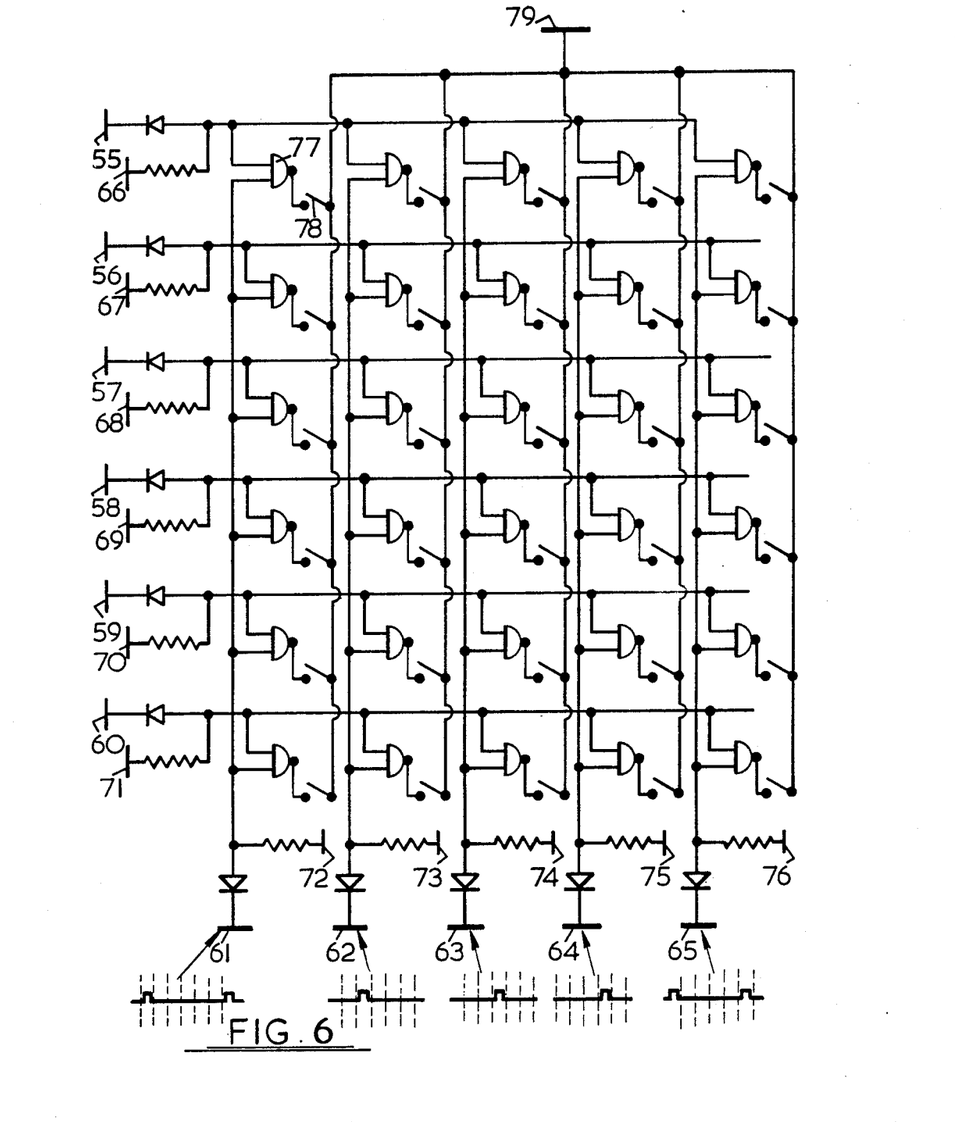
FIG. 6 shows programme denial circuitry.

Referring now to FIG. 6, a circuit which makes it possible to selectively deny any of the 30 channels of the system to a particular subscriber will be described.

In this circuit, the head-end is provided with means for generating group and local oscillator denial signals in respect of each subscriber which signals are transmitted to the relevant exchange. These signals comprise six group denial inputs which are applied to inputs 55 to 60 (FIG. 6) and five local oscillator denial inputs which are applied to inputs 61 to 65. When no programmes are to be denied, each input 55 to 65 carries zero volts. When a programme on a particular channel is to be denied, the pair of inputs from the groups 55 to 60 and 61 to 65 corresponding to that channel carry a positive voltage.

Further inputs 66 to 71 are connected to the subscribers group selector counter 47 (FIG. 5) and further inputs 72 to 76 are connected to the subscribers local oscillator selector counter 52 (FIG. 5). A matrix of thirty two-input NAND gates 77 are connected between each of the inputs 55 to 60 and respective ones of the inputs 61 to 65. The outputs of the NAND gates 77 are applied via override switches 78 to an output 79.

If we assume that each one of the switches 78 is closed and that the subscriber selects the first channel of the first group of channels then inputs 66 and 72 go positive. If either of inputs 55 and 61 is at zero volts, the respective input of the NAND gate stays at zero volts. If however both inputs 55 and 61 are positive, the positive potentials on inputs 66 and 72 are received at the inputs of the gate 77, the output of which then goes to zero volts. This output is used to reset the selection circuitry to a datum condition, whereby the subscriber is effectively denied the programme he has selected.

To enable selective denial of any one or more of the thirty channels of the described system, the denial signals transmitted from the head-end are "slotted", i.e. each of inputs 61 to 65 receives a continuously repeated respective input waveform comprising five time slots, the waveform during one slot being positive and during the other four slots being zero volts. As shown in FIG. 6, the waveforms appearing at inputs 61 to 65 have a fixed phase relationship such that no two inputs receive a positive signal at the same time. If it is now desired to deny any programme channel, this is simply achieved by applying a positive signal to the appropriate one of group denial inputs 55 to 60 for the duration of the appropriate time slot. For example, if a signal is applied to input 57 which is identical to the signal applied to input 61, the NAND gate 77 connected to those two inputs will cause the selector circuitry to reset but no other NAND gate will receive two positive inputs simultaneously and therefore no other programme channel will be denied. As a further example, if it were desired to deny all of the group of channels associated with inut 55, this would be achieved by applying a continuous positive voltage to input 55.

If it was not desired to be able to deny any one of the channels, but merely one channel from each group, i.e. the first, second, third, fourth and fifth channels from the first, second, third, fourth and fifth groups respectively, this could be achieved using continuous rather than time-slotted denial signals and only five NAND gates connected to the appropriate denial inputs.

The override switches 78 are provided to make it possible to disable the subscriber denial circuitry in respect of particular channels. As an alternative to the switches 78, the NAND gates may be pluggable so that the removal of any one gate would have the same effect as opening one of the switches 78.

What is claimed is:

1. A wired broadcasting system comprising a central station at which a plurality of television signals are made available, a plurality of exchanges connected to the central station by a plurality of trunk cables on which the television signals are broadcast, and a plurality of subscriber units each connected to an exchange, each subscriber unit being provided with means for controlling a respective selector at the exchange to select a desired one of the programme signals for transmission to that subscriber, characterised in that each trunk cable carries a plurality of frequency division multiplexed signals and each selector comprises a first selecting means for selecting the signals on one said trunk cable and a second selecting means for selecting one of the signals on said one trunk cable for transmission to the respective subscriber unit.

2. A wired broadcasting system according to claim 1, wherein the first selecting means is in the form of a first array of solid state switches arranged between each trunk cable and a common output connected to the second selecting means.

3. A wired broadcasting system according to claim 1 or 2, wherein the second selecting means comprises a mixer receiving the output of the first selecting means and the common output of a second array of solid state switches respective ones of which are connected to the outputs of local oscillators.

4. A wired broadcasting system according to claim 1, wherein the frequencies provided by the local oscillators are such that each of them when mixed with a respective signal on the trunk cable produces an output signal at a frequency to which the subscriber unit is permanently tuned.

5. A wired broadcasting system according to claim 4, wherein the frequencies of the signals on each trunk cable are interrelated to avoid the production of spurious second or third order signals.

6. A wired broadcasting system according to claim 4 or 5, wherein the mixer is in the form of a field effect transistor.

7. A wired broadcasting system according to claim 1, wherein the subscriber unit controlling means is in the form of a dialling unit which when actuated transmits a train of pulses to the exchange, the number of pulses in the train corresponding to a reference number selected by the subscriber, the subscriber being required to generate two pulse trains to select a programme, the first train controlling the group selection and the second train controlling the selection of one programme signal from that group.

8. A wired broadcasting system according to claim 7, comprising first and second counters to count the pulses, the counters being enabled and disabled by a single bistable circuit such that the first train is counted by the first counter, an interdigital pulse causes the bistable to change state, and the second train is counted by the second counter, the first and second counters respectively controlling the first and second arrays of solid state switches.

* * * * *